United States Patent
Chen et al.

(10) Patent No.: US 10,743,313 B2
(45) Date of Patent: Aug. 11, 2020

(54) SMART LOAD-BASED DEPLOYMENT AND TUNING OF NARROWBAND CARRIERS

(71) Applicants: AT&T Intellectual Property I, L.P., Atlanta, GA (US); AT&T Mobility II LLC, Atlanta, GA (US)

(72) Inventors: Ye Chen, Milton, GA (US); Rajendra Prasad Kodaypak, Sammamish, WA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 122 days.

(21) Appl. No.: 16/154,427

(22) Filed: Oct. 8, 2018

(65) Prior Publication Data

US 2019/0045512 A1    Feb. 7, 2019

Related U.S. Application Data

(63) Continuation of application No. 15/215,255, filed on Jul. 20, 2016, now Pat. No. 10,123,152.

(51) Int. Cl.
*H04W 72/04* (2009.01)
*H04L 29/08* (2006.01)
(Continued)

(52) U.S. Cl.
CPC ..... *H04W 72/0453* (2013.01); *H04L 43/0876* (2013.01); *H04L 43/16* (2013.01);
(Continued)

(58) Field of Classification Search
CPC . H04W 4/005; H04W 24/08; H04W 72/0453; H04W 84/042; H04L 67/12
See application file for complete search history.

(56) References Cited

U.S. PATENT DOCUMENTS 6,275,990 B1 * 8/2001 Dapper ................... G06F 17/14
725/106
6,658,257 B1 * 12/2003 Hirayama ............. H04W 16/14
455/451
(Continued)

FOREIGN PATENT DOCUMENTS

CN    103702369 A    4/2014

OTHER PUBLICATIONS

"Cellular Networks for Massive Iot", Ericsson White Paper, Jan. 2016.
(Continued)

*Primary Examiner* — Khaled M Kassim
(74) *Attorney, Agent, or Firm* — Guntin & Gust, PLC; Jay H. Anderson

(57) ABSTRACT

Aspects of the subject disclosure may include, for example, a device providing network communications services to user devices using a frequency band and to machine-to-machine (M2M) communication devices in the Internet of Things (IoT). The device monitors traffic loads in the frequency band due to the user devices and due to the M2M communication devices. Depending on the traffic loads, the M2M communication devices use a narrowband carrier within the frequency band, within the adjacent guard band, or separate from the frequency band and guard band as a standalone carrier. The narrowband M2M carriers are dynamically deployed to support the user devices and IoT devices. Other embodiments are disclosed.

20 Claims, 9 Drawing Sheets

(51) Int. Cl.
*H04W 24/02* (2009.01)
*H04L 12/26* (2006.01)
*H04W 4/70* (2018.01)
*H04W 24/08* (2009.01)
*H04W 84/04* (2009.01)

(52) U.S. Cl.
CPC .............. *H04L 67/12* (2013.01); *H04W 4/70* (2018.02); *H04W 24/02* (2013.01); *H04W 24/08* (2013.01); *H04W 84/042* (2013.01)

(56) References Cited

U.S. PATENT DOCUMENTS

| | | | |
|---|---|---|---|
| 9,220,101 B2 | 12/2015 | Awoniyi et al. | |
| 2004/0082335 A1* | 4/2004 | Hirayama | H04W 16/14 455/450 |
| 2009/0163223 A1* | 6/2009 | Casey | H04W 36/22 455/453 |
| 2015/0163680 A1 | 6/2015 | Valliappan et al. | |
| 2015/0181583 A1* | 6/2015 | Siomina | H04W 16/14 370/330 |
| 2015/0200758 A1 | 7/2015 | Wakabayashi | |
| 2015/0334643 A1* | 11/2015 | Maaref | H04B 1/0003 370/329 |
| 2016/0021661 A1 | 1/2016 | Yerramalli et al. | |
| 2016/0044538 A1* | 2/2016 | Aksu | H04W 28/085 370/235 |
| 2016/0105803 A1 | 4/2016 | Sakhnini et al. | |
| 2016/0112898 A1 | 4/2016 | Chen et al. | |
| 2016/0127936 A1 | 5/2016 | Chatterjee et al. | |
| 2017/0336821 A1* | 11/2017 | Ramezan Pour Safaei | G05F 1/67 |
| 2017/0339629 A1* | 11/2017 | Lindoff | H04W 76/27 |
| 2017/0373900 A1* | 12/2017 | Adhikary | H04W 56/0015 |
| 2018/0020452 A1* | 1/2018 | Yerramalli | H04L 27/0006 |
| 2018/0027356 A1 | 1/2018 | Chen et al. | |

OTHER PUBLICATIONS

"NB-IOT—Enabling New Business Opportunities", Huawei Technologies, 2015.

"NB-IOT: A Sustainable Technology for Connecting Billions of Devices", Charting the Future of Innovation vol. 93, 2016.

Palattella, Maria R. et al., "Internet of Things in the 5G Era: Enablers, Architecture and Business Models", Aug. 2015.

* cited by examiner

100

500

600

SMART LOAD-BASED DEPLOYMENT AND TUNING OF NARROWBAND CARRIERS

CROSS REFERENCE TO RELATED APPLICATIONS

This application is a continuation of U.S. application Ser. No. 15/215,255, filed Jul. 20, 2016, which is incorporated herein by reference in its entirety.

FIELD OF THE DISCLOSURE

The subject disclosure relates to wireless communication networks, and more particularly to deployment and tuning of narrow bandwidth channels suitable for communicating with devices in the Internet of Things (IoT).

BACKGROUND

A very wide variety of devices with differing device capabilities may connect to a communication network at various times and for various purposes (for example, a sensor periodically transmitting small amounts of data to a computing device). A network that includes such devices is sometimes referred to as the "Internet of things" (IoT). Devices in the IoT generally use machine-to-machine (M2M) communications and can use narrow bandwidth channels (approximately 200 kHz), referred to herein as NB-IoT carriers. NB-IoT carriers can co-exist with long term evolution (LTE) communication channels which typically have much greater bandwidth.

BRIEF DESCRIPTION OF THE DRAWINGS

Reference will now be made to the accompanying drawings, which are not necessarily drawn to scale, and wherein.

DETAILED DESCRIPTION

Figure 1:
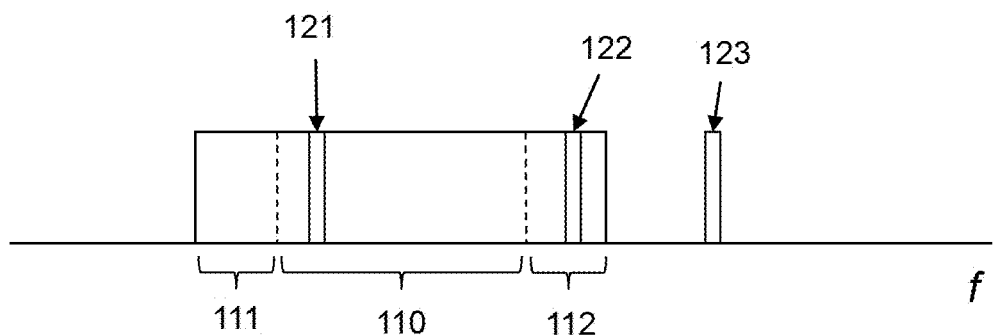
FIG. 1 schematically illustrates a portion of the RF spectrum including an LTE carrier and NB-IoT carriers, in accordance with embodiments of the disclosure.

The subject disclosure describes, among other things, illustrative embodiments for providing communications services over a network to user communication devices and to machine-to-machine (M2M) communication devices, where narrowband M2M carriers are deployed within the frequency band of the user communication devices or within the guard band adjacent to that frequency band. Other embodiments are described in the subject disclosure.

One or more aspects of the subject disclosure can include a method comprising providing, by a processing system including a processor, communications services over a network to user communication devices and to machine-to-machine (M2M) communication devices; communications services are provided to the user communication devices using a carrier frequency band having a guard band in a spectral region adjacent to the carrier frequency band. The method can also comprise monitoring a first communications traffic load in the carrier frequency band due to the user communication devices. The method can also comprise, responsive to the first communications traffic load being less than a first threshold, facilitating communications by the M2M communication devices using a first M2M frequency band narrower than the carrier frequency band and within the carrier frequency band. The method can also comprise, responsive to the first communications traffic load being not less than the first threshold and less than a second threshold, the first threshold being less than the second threshold, facilitating communications by the M2M communication devices using a second M2M frequency band narrower than the guard band and within the guard band. The method can also comprise, responsive to the first communications traffic load being not less than the second threshold, facilitating, by the processing system, communications by the M2M communication devices using a third M2M frequency band separate from the carrier frequency band and the guard band. The method can further comprise adjusting a spectral location of the communications by the M2M communication devices responsive to the first communications traffic load.

One or more aspects of the subject disclosure can include a device comprising a processing system including a processor and a memory that stores executable instructions that, when executed by the processing system, facilitate performance of operations. The operations can comprise providing communications services over a network to user communication devices using a carrier frequency band and to machine-to-machine (M2M) communication devices, the carrier frequency band having a guard band in a spectral region adjacent to the carrier frequency band; monitoring a first communications traffic load in the carrier frequency band due to the user communication devices; and monitoring a second communications traffic load due to the M2M communication devices. The operations can also comprise, responsive to the first communications traffic load being less than a first threshold, facilitating communications by the M2M communication devices using a first M2M frequency band narrower than the carrier frequency band and within the carrier frequency band. The operations can also comprise, responsive to the first communications traffic load being not less than the first threshold and less than a second threshold, the first threshold being less than the second threshold, facilitating communications by the M2M communication devices using a second M2M frequency band narrower than the guard band and within the guard band. The operations can further comprise, responsive to the first communications traffic load being not less than the second threshold, facilitating communications by the M2M communication devices using a third M2M frequency band separate from the carrier frequency band and the guard band.

One or more aspects of the subject disclosure can include a machine-readable storage medium comprising executable instructions that, when executed by a processing system including a processor, facilitate performance of operations. The operations comprise providing communications services over a network to user communication devices using a carrier frequency band and to machine-to-machine (M2M) communication devices, the carrier frequency band having a guard band in a spectral region adjacent to the carrier frequency band; and monitoring a first communications traffic load in the carrier frequency band due to the user communication devices. The operations also comprise, responsive to the first communications traffic load being less than a first threshold, facilitating communications by the M2M communication devices using a first M2M frequency band narrower than the carrier frequency band and within the carrier frequency band. The operations also comprise, responsive to the first communications traffic load being not less than the first threshold and less than a second threshold, the first threshold being less than the second threshold, facilitating communications by the M2M communication devices using a second M2M frequency band narrower than the guard band and within the guard band. The operations further comprise, responsive to the first communications traffic load being not less than the second threshold, facilitating communications by the M2M communication devices using a third M2M frequency band separate from the carrier frequency band and the guard band.

FIG. 1 schematically illustrates a portion 100 of the RF spectrum used by an LTE communication system, including an LTE carrier and NB-IoT carriers, in accordance with embodiments of the disclosure. The LTE carrier (also referred to herein as an LTE band or carrier band) 110 has guard bands 111, 112 adjacent to band 110 and at lower and higher frequencies respectively. A NB-IoT carrier can be deployed within an existing LTE band as an in-band NB-IoT carrier 121, or within an existing guard band as a guard-band NB-IoT carrier 122. Alternatively, a NB-IoT carrier can be located outside the frequency range of the LTE band and guard bands; this is referred to as a standalone NB-IoT carrier 123. NB-IoT carriers 121-123 typically each have a bandwidth of 200 kHz.

An in-band NB-IoT deployment 121 removes 200 kHz of usable bandwidth from LTE carrier band 110, which may reduce LTE capacity in LTE high traffic conditions. However, the in-band NB-IoT carrier 121 can generally avoid interference from other NB-IoT carriers. A guard-band NB-IoT deployment 122 does not reduce LTE carrier capacity, but may result in increased interference. A standalone NB-IoT deployment 123 generally does not impact existing LTE carriers.

Figure 2:
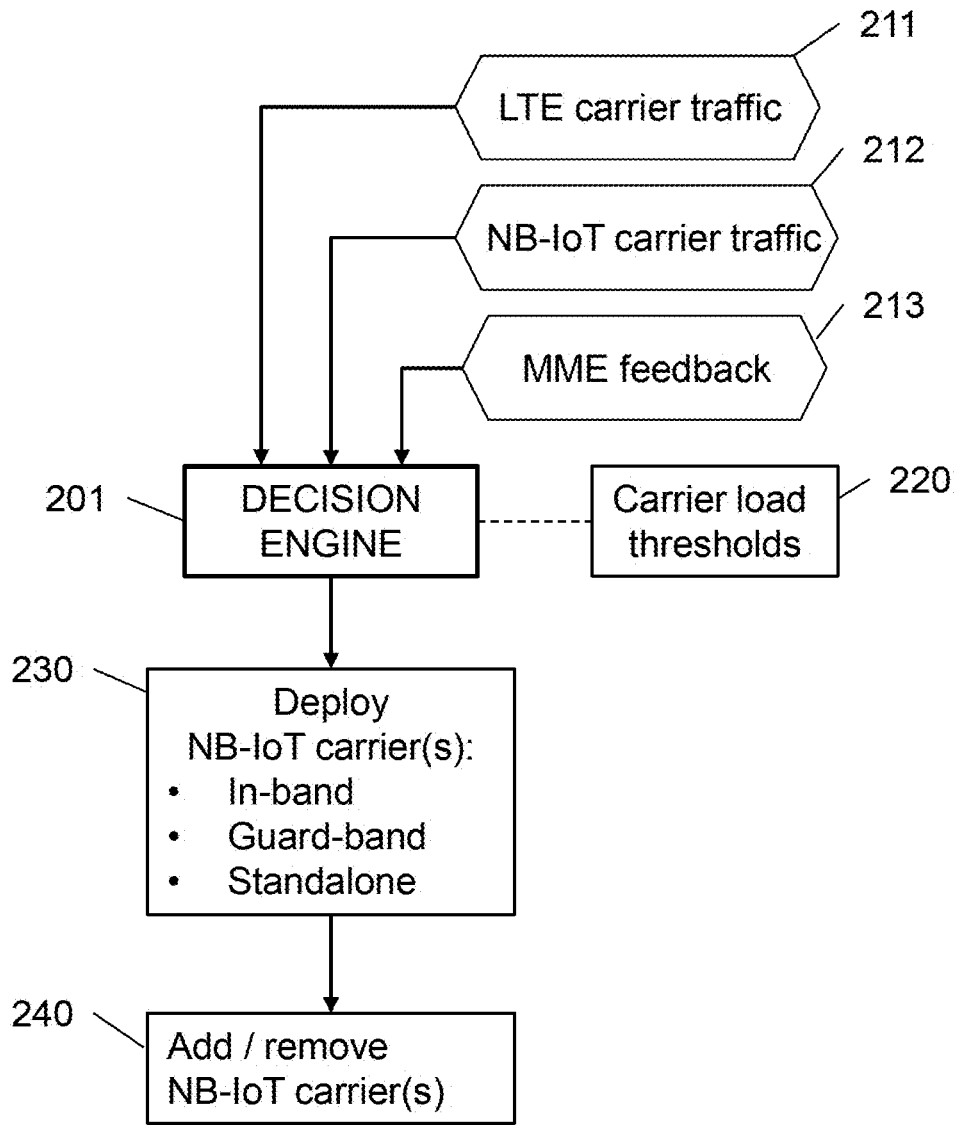
FIG. 2 schematically illustrates procedures performed by a decision engine for dynamically adding and/or removing NB-IoT carriers from a portion of the spectrum that includes an LTE carrier, according to embodiments of the disclosure.

FIG. 2 is a schematic illustration 200 of procedures performed by a decision engine 201, for dynamically adding and/or removing NB-IoT carriers from portion 100 of the spectrum that includes LTE carrier band 110, according to embodiments of the disclosure. In an embodiment, decision engine 201 executes on a server coupled to an LTE communication system that facilitates communications via LTE carrier band 110. In this embodiment, decision engine 201 receives inputs including measurements of LTE carrier traffic 211 and NB-IoT carrier traffic 212; the inputs also include feedback 213 from a mobile management entity (MME) that manages access to the LTE communications system. In an embodiment, a plurality of MMEs in a pooled configuration communicate with decision engine 201.

In an embodiment, decision engine 201 uses predetermined thresholds 220 to determine whether traffic on a carrier is congested; that is, traffic on a carrier is determined to be low if below the threshold for that carrier, and high (or congested) if above the threshold.

Decision engine 201 chooses a deployment method 230 for NB-IoT carriers in accordance with the inputs 211-213 and the thresholds 220. In this embodiment, a NB-IoT carrier can be deployed as an in-band carrier 121, a guard-band carrier 122, or a standalone carrier 123. In an embodiment, decision engine 201 can also direct addition/removal 240 of a NB-IoT carrier.

Figure 3:
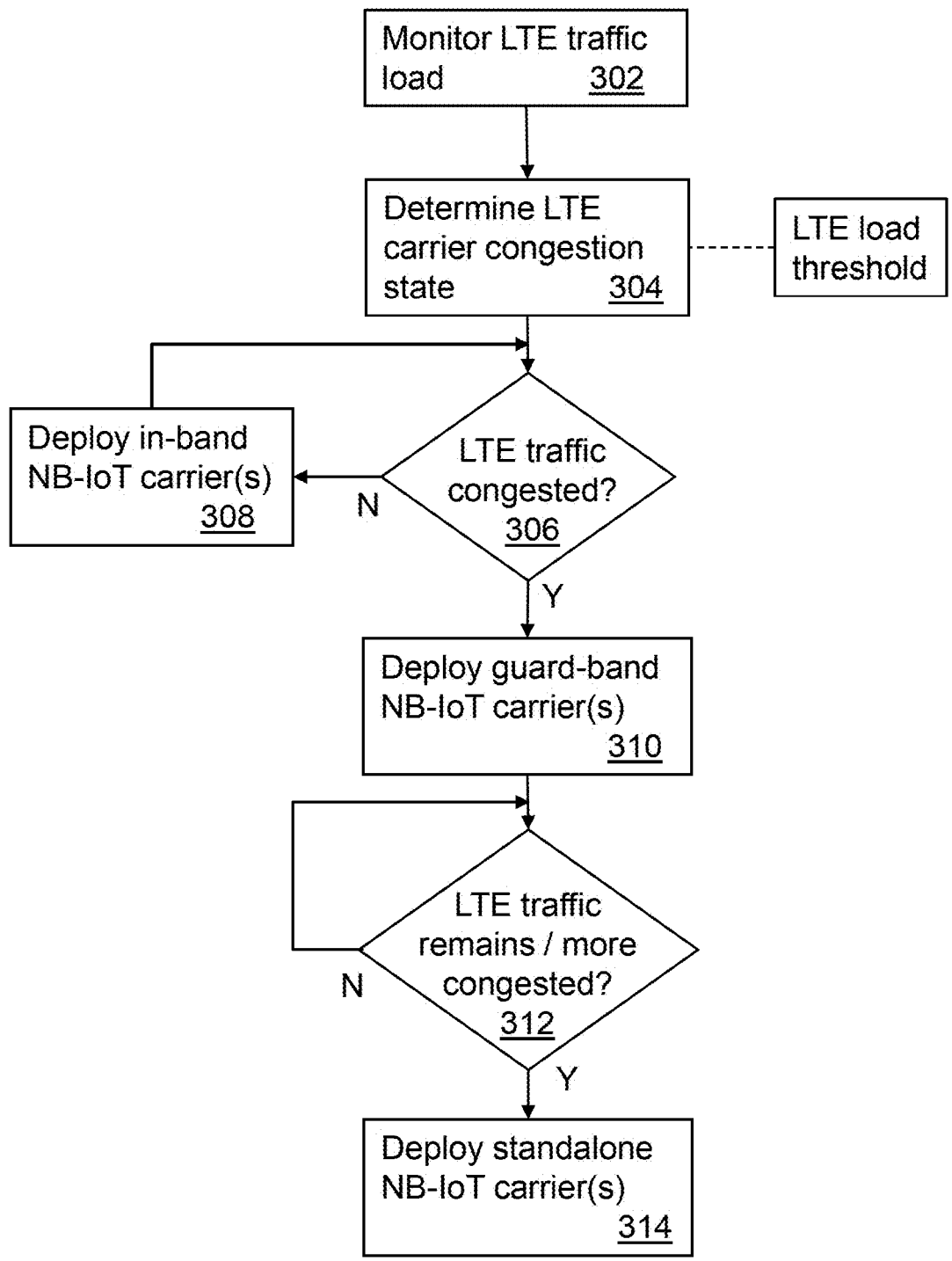
FIG. 3 depicts an illustrative embodiment of a method for deploying NB-IoT carriers based on the procedures of FIG. 2 and monitoring of LTE traffic.

FIG. 3 is a flowchart depicting an illustrative embodiment of a method 300 for dynamic deployment (including addition and/or removal) of one or more NB-IoT carriers, based on the LTE communications traffic load. In this embodiment, LTE communications traffic, including traffic on the LTE carrier band 110, is continuously monitored (step 302) to generate LTE traffic load data. Decision engine 201 uses the LTE traffic load data and the LTE load threshold for the carrier to determine a congestion state of the LTE carrier (step 304).

If the LTE traffic load is low (step 306), the decision engine 201 directs deployment of one or more in-band NB-IoT carriers (step 308). If the LTE traffic is congested, the decision engine directs deployment of one or more guard-band NB-IoT carriers (step 310). In an embodiment, when the LTE traffic load threshold is exceeded, existing NB-IoT carriers can remain in the LTE carrier band but new NB-IoT carriers are deployed in the guard band.

If the LTE traffic remains congested or becomes more congested (step 312), NB-IoT carriers are deployed as standalone carriers (step 314). In an embodiment, existing in-band NB-IoT carriers are removed to relieve congestion in the LTE carrier band while standalone NB-IoT carriers are added, if the LTE traffic congestion persists for a predetermined period of time. In another embodiment, existing in-band NB-IoT carriers are removed and standalone NB-IoT carriers are added if a higher traffic load threshold is exceeded (that is, the LTE traffic transitions from a "congested" state to a "very congested" state). In another embodiment, all new NB-IoT carriers are deployed as standalone carriers if the LTE traffic is congested and predetermined limits on a number of in-band NB-IoT carriers and/or guard-band NB-IoT carriers are reached.

In another embodiment, if the LTE traffic diminishes so that the LTE carrier transitions from a "congested" state to a "not congested" state, existing NB-IoT standalone carriers are removed and in-band and/or guard-band NB-IoT carriers are added, provided that the LTE carrier remains in the "not congested" state.

Figure 4:
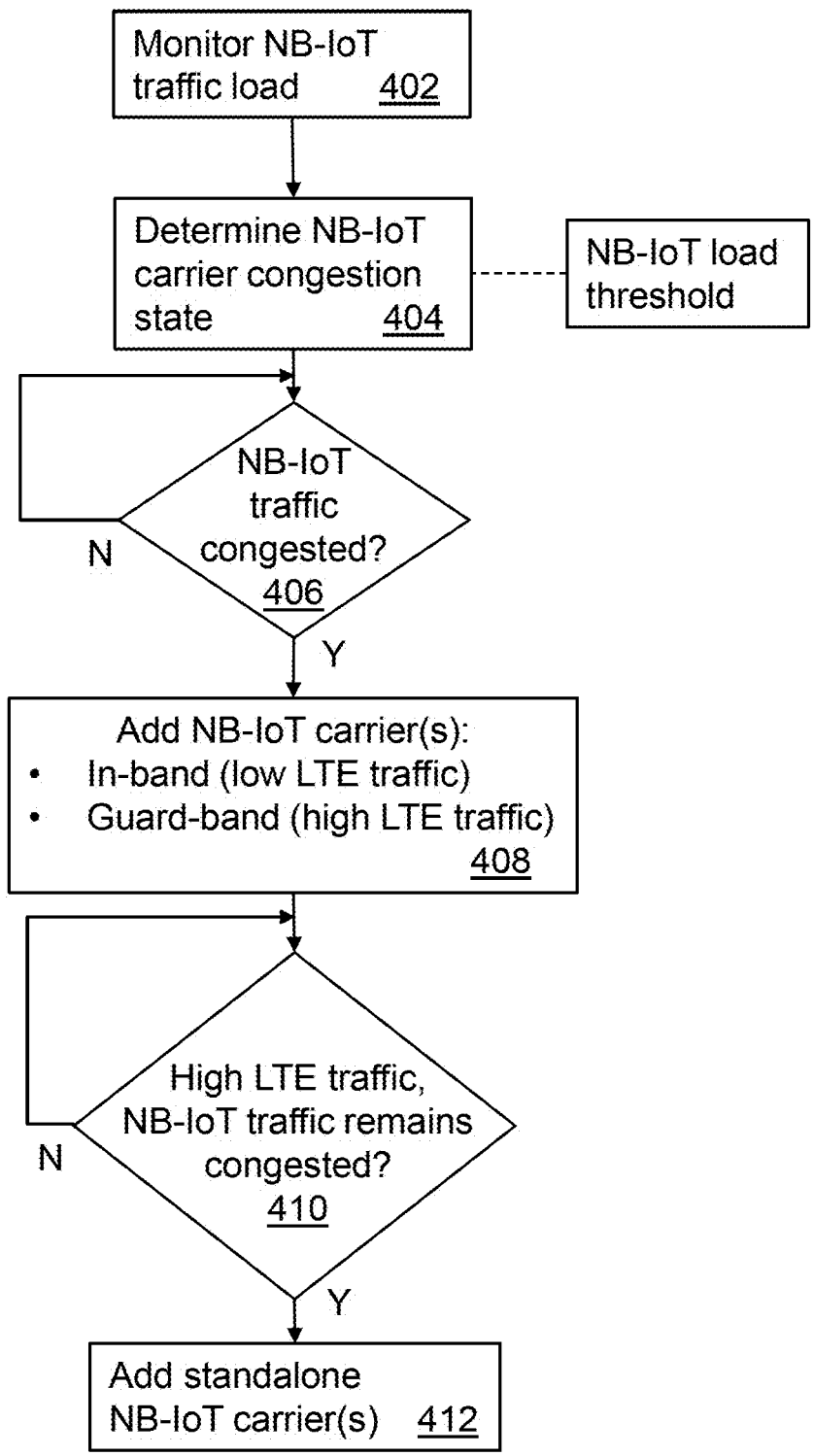
FIG. 4 depicts an illustrative embodiment of a method for deploying NB-IoT carriers based on the procedures of FIG. 2 and monitoring of NB-IoT traffic.

FIG. 4 is a flowchart depicting an illustrative embodiment of a method 400 for dynamic deployment (including addition and/or removal) of one or more NB-IoT carriers, based on the NB-IoT traffic load. In this embodiment, NB-IoT communications traffic, including traffic on in-band, guard-band and standalone NB-IoT carriers 121-123, is continuously monitored (step 402) to generate NB-IoT traffic load data. Decision engine 201 uses the NB-IoT traffic load data and the NB-IoT load threshold for the NB-IoT carriers to determine a congestion state of the NB-IoT carriers (step 404). In an embodiment, the traffic load thresholds are different for the different types of NB-IoT band deployment (in-band 121, guard-band 122, or standalone 123).

If the NB-IoT traffic is congested (step 406), the decision engine 201 directs deployment of one or more in-band and/or guard-band NB-IoT carriers, depending on the congestion state of the LTE carrier band (step 408). If the LTE traffic and the NB-IoT traffic both remain congested (step 410), additional NB-IoT carriers are deployed as standalone carriers (step 412).

In an embodiment, NB-IoT standalone carriers are deployed if the NB-IoT traffic congestion persists for a predetermined period of time. In other embodiments, NB-IoT standalone carriers are deployed if a higher traffic load threshold is exceeded (that is, the NB-IoT traffic transitions from a "congested" state to a "very congested" state while the LTE traffic persists in a "congested" or "very congested" state), or if predetermined limits on a number of in-band NB-IoT carriers and/or guard-band NB-IoT carriers are reached.

In another embodiment, if the NB-IoT traffic diminishes so that the NB-IoT carriers of a given type of deployment (for example, in-band IoT carriers) transition from a "congested" state to a "not congested" state, existing NB-IoT standalone carriers are removed and in-band and/or guard-band NB-IoT carriers are added, provided that the LTE carrier is also in a "not congested" state.

Figure 5:
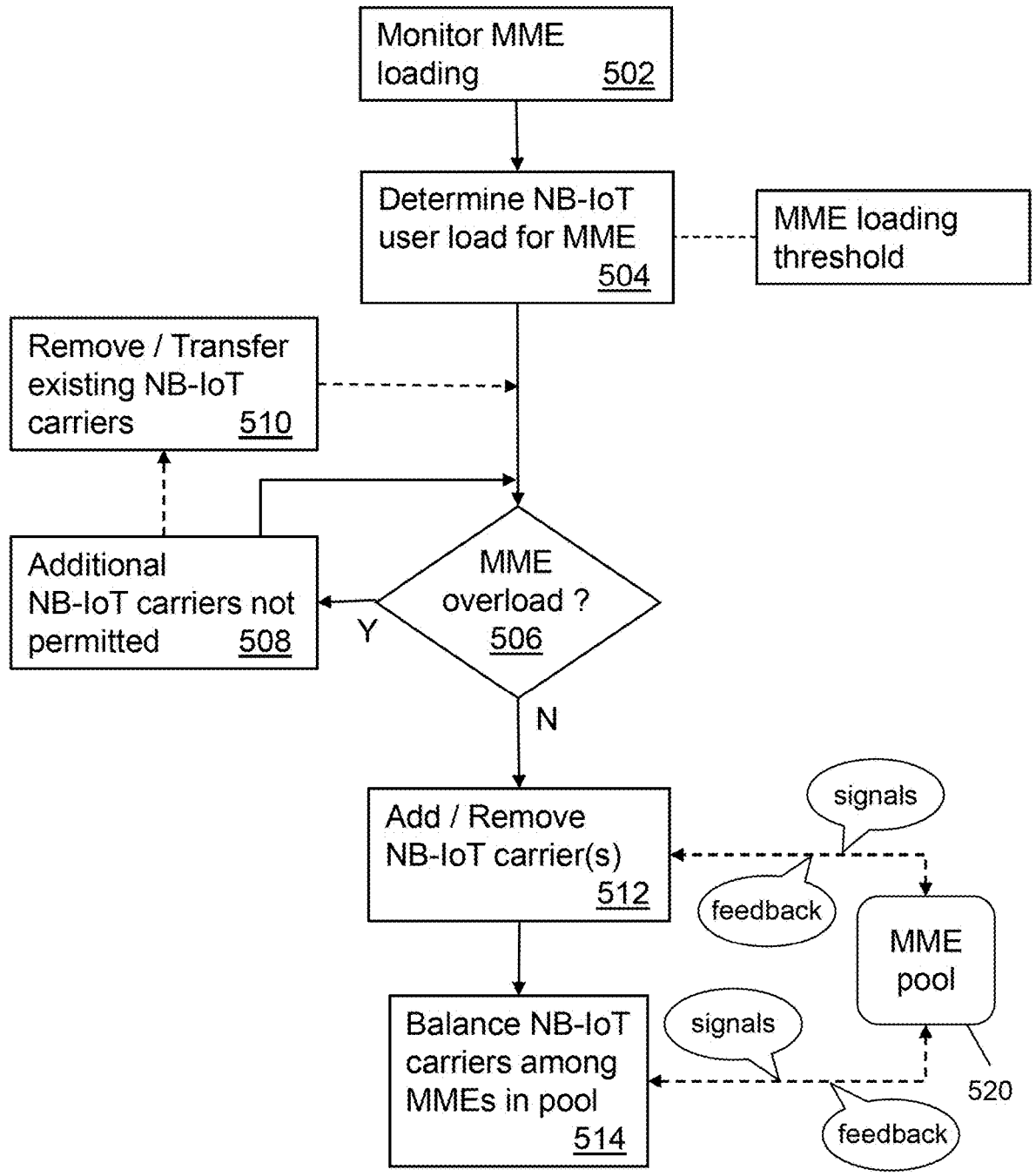
FIG. 5 depicts an illustrative embodiment of a method for deploying NB-IoT carriers based on the procedures of FIG. 2 and monitoring of MME loading in a communication system.

FIG. 5 is a flowchart depicting an illustrative embodiment of a method 500 for dynamic deployment (including addition and/or removal) of one or more NB-IoT carriers, based loading of the mobility management entity (MME). In this embodiment, the MME loading is continuously monitored (step 502) to generate NB-IoT user load data (step 504).

If the MME is determined to be overloaded (step 506), the decision engine 201 directs that no additional NB-IoT carriers be deployed (step 508). In an embodiment, the decision engine can direct that existing NB-IoT carriers be removed (step 510). In another embodiment, the MME is one of a plurality of MMEs in a pooled configuration, and the decision engine can direct that the user load represented by one or more NB-IoT carriers be redistributed to another MME in the MME pool.

If the MME is not overloaded (or has recovered from an overload condition), the decision engine directs that NB-IoT carriers be dynamically added or removed based on the LTE carrier traffic and/or the NB-IoT carrier traffic (step 512). In an embodiment, the NB-IoT load is distributed among MMEs in a pooled configuration (step 514). In this embodiment, the decision engine sends signals to, and receives feedback from, the MMEs in pool 520 to obtain loading information and thus ensure that the NB-IoT load is balanced among the specific MMEs in the pool.

While for purposes of simplicity of explanation, the respective processes are shown and described as a series of blocks in FIGS. 2-5, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 6:
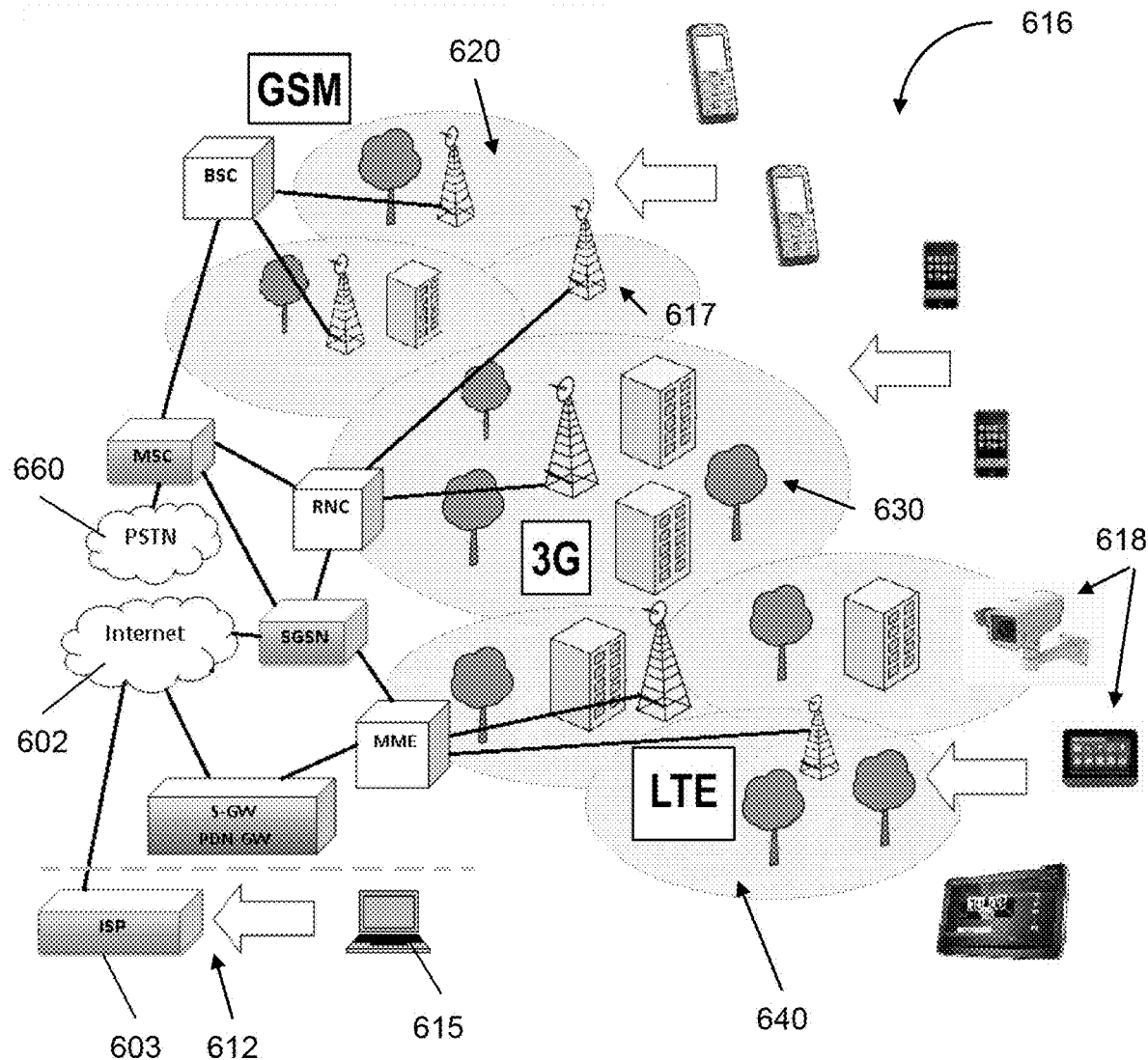
FIGS. 6-7 depict illustrative embodiments of systems that provide communications services to LTE and IoT devices.

FIG. 6 depicts an illustrative embodiment of an architecture 600 for a network for interacting with mobile communication devices and/or IoT devices. According to an embodiment of the disclosure, one or more mobile devices 616 and IoT devices 618 can connect with one or more of the networks shown in FIG. 6. Mobile devices 616 may represent a variety of technologies (phones, tablets, etc.) and may have an end-to-end connection established with either the Public Switched Telephone Network (PSTN) 660, in the case of voice traffic, or an internet protocol network (Internet) 602, in the case of data traffic. The architecture can include a Global System for Mobile (GSM) network 620, a 3G network 630, and/or a Long Term Evolution (LTE) network 640. In particular, LTE specifications define an all-internet protocol architecture with voice over internet protocol (VoIP).

FIG. 6 also illustrates a device 615 accessing the network through a broadband connection 612 to an Internet Service Provider (ISP) 603. Any of devices 615-616, coupled to a computing device (e.g. a server) of the ISP, can comprise a processing system including a processor and a memory that stores executable instructions that, when executed by the processing system, facilitate performance of operations. The operations can comprise providing communications services over a network to user communication devices using a carrier frequency band and to machine-to-machine (M2M) communication devices, the carrier frequency band having a guard band in a spectral region adjacent to the carrier frequency band; monitoring a first communications traffic load in the carrier frequency band due to the user communication devices; and monitoring a second communications traffic load due to the M2M communication devices. The operations can also comprise, responsive to the first communications traffic load being less than a first threshold, facilitating communications by the M2M communication devices using a first M2M frequency band narrower than the carrier frequency band and within the carrier frequency band. The operations can also comprise, responsive to the first communications traffic load being not less than the first threshold and less than a second threshold, the first threshold being less than the second threshold, facilitating communications by the M2M communication devices using a second M2M frequency band narrower than the guard band and within the guard band. The operations can further comprise, responsive to the first communications traffic load being not less than the second threshold, facilitating communications by the M2M communication devices using a third M2M frequency band separate from the carrier frequency band and the guard band.

Figure 7:
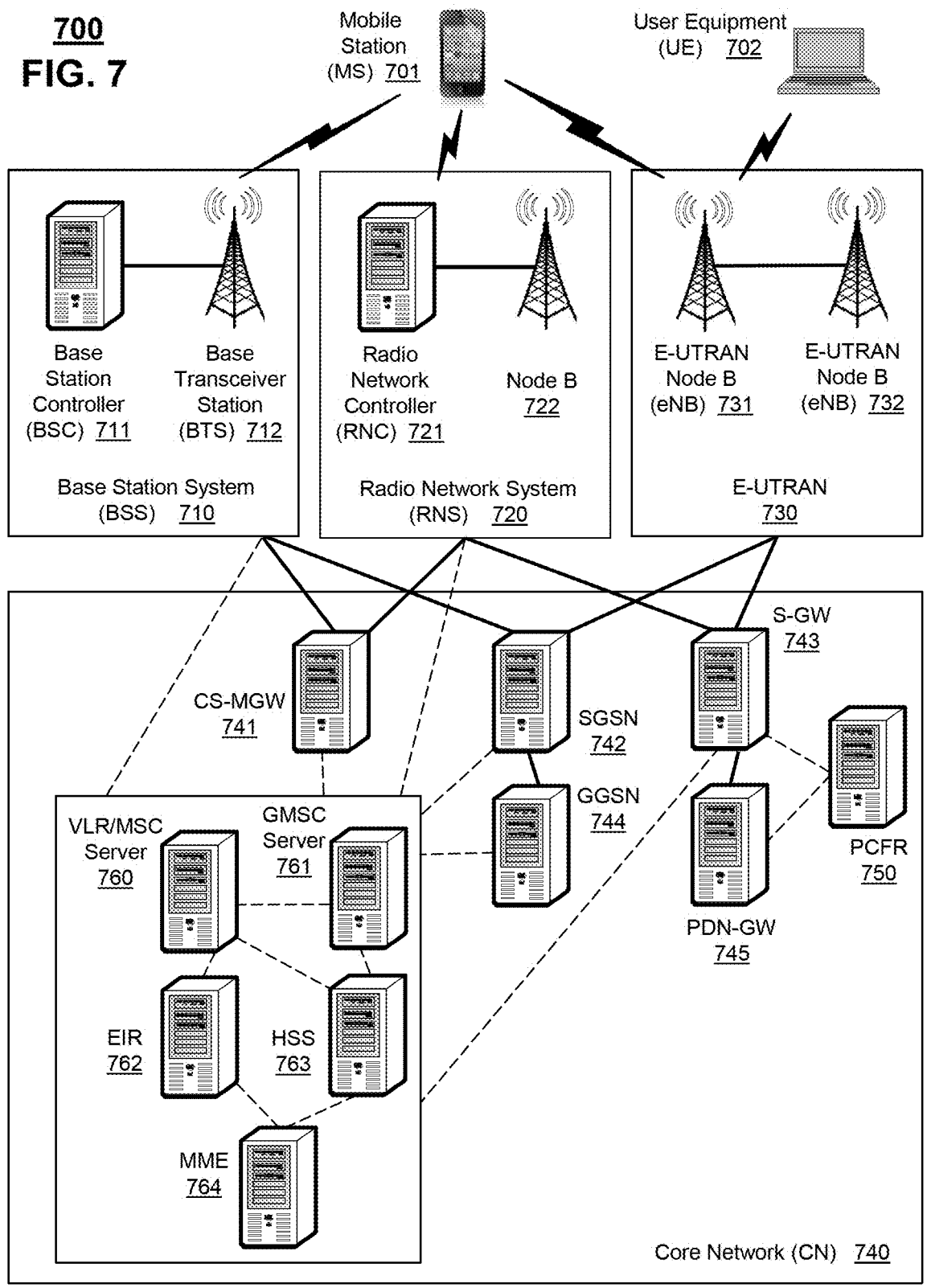

FIG. 7 schematically illustrates a communication system 700 in which one or more embodiments of the subject disclosure may be implemented. Mobile Station 701 may be one of, but not limited to, a cellular telephone, a cellular telephone in combination with another electronic device or any other wireless mobile communication device. According to an embodiment of the disclosure, Mobile Station 701 and/or User Equipment 702 can communicate with one or more of the systems shown in FIG. 7 using carrier aggregation.

Mobile Station 701 may communicate wirelessly with Base Station System (BSS) 710. BSS 710 contains a Base Station Controller (BSC) 711 and a Base Transceiver Station (BTS) 712. BSS 710 may include a single BSC 711/BTS 712 pair (Base Station) or a system of BSC/BTS pairs which are part of a larger network. BSS 710 is responsible for communicating with Mobile Station 701 and may support one or more cells. BSS 710 is responsible for handling cellular traffic and signaling between Mobile Station 701 and Core Network 740. BSS 710 can perform functions that include, but are not limited to, digital conversion of speech channels, allocation of channels to mobile devices, paging, and transmission/reception of cellular signals.

Additionally, Mobile Station 701 may communicate wirelessly with Radio Network System (RNS) 720. RNS 720 contains a Radio Network Controller (RNC) 721 and one or more Node(s) B 722. RNS 720 may support one or more cells. RNS 720 may also include one or more RNC 721/Node B 722 pairs or alternatively a single RNC 721 may manage multiple Nodes B 722. RNS 720 is responsible for communicating with Mobile Station 701 in its geographically defined area. RNC 721 is responsible for controlling the Node(s) B 722 that are connected to it and is a control element in a UMTS radio access network. RNC 721 can perform functions such as, but not limited to, load control, packet scheduling, handover control, security functions, as well as controlling access by Mobile Station 701 access to the Core Network (CN).

The evolved UMTS Terrestrial Radio Access Network (E-UTRAN) 730 is a radio access network that provides wireless data communications for Mobile Station 701 and User Equipment 702. E-UTRAN 730 provides higher data rates than traditional UMTS. It is part of the Long Term Evolution (LTE) upgrade for mobile networks; later releases meet the requirements of the International Mobile Telecommunications (IMT) Advanced and are commonly known as a 4G networks. E-UTRAN 730 may include a series of logical network components such as E-UTRAN Node B (eNB) 731 and E-UTRAN Node B (eNB) 732. E-UTRAN 730 may contain one or more eNBs. User Equipment 702 may be any user device capable of connecting to E-UTRAN 730 including, but not limited to, a personal computer, laptop, mobile device, wireless router, or other device capable of wireless connectivity to E-UTRAN 730. The improved performance of the E-UTRAN 730 relative to a typical UMTS network allows for increased bandwidth, spectral efficiency, and functionality including, but not limited to, voice, high-speed applications, large data transfer and IPTV, while still allowing for full mobility.

An exemplary embodiment of a mobile data and communication service that may be implemented in the PLMN architecture described in FIG. 7 is the Enhanced Data rates for GSM Evolution (EDGE). EDGE is an enhancement for GPRS networks that implements an improved signal modulation scheme known as 9-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Mobile Station 701 may communicate with any or all of BSS 710, RNS 720, or E-UTRAN 730. In an illustrative system, each of BSS 710, RNS 720, and E-UTRAN 730 may provide Mobile Station 701 with access to Core Network 740. The Core Network 740 may include of a series of devices that route data and communications between end users. Core Network 740 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched-Media Gateway Function (CS-MGW) 741 is part of Core Network 740, and interacts with Visitor Location Register (VLR) and Mobile-Services Switching Center (MSC) Server 760 and Gateway MSC Server 761 in order to facilitate Core Network 740 resource control in the CS domain. Functions of CS-MGW 741 include, but are not limited to, media conversion, bearer control, payload processing and other mobile network processing such as handover or anchoring. CS-MGW 741 may receive connections to Mobile Station 701 through BSS 710, RNS 720 or both.

Serving GPRS Support Node (SGSN) 742 stores subscriber data regarding Mobile Station 701 in order to facilitate network functionality. SGSN 742 may store subscription information such as, but not limited to, the International Mobile Subscriber Identity (IMSI), temporary identities, or Packet Data Protocol (PDP) addresses. SGSN 742 may also store location information such as, but not limited to, the Gateway GPRS Support Node (GGSN) 744 address for each GGSN where an active PDP exists. GGSN 744 may implement a location register function to store subscriber data it receives from SGSN 742 such as subscription or location information.

Serving Gateway (S-GW) 743 is an interface which provides connectivity between E-UTRAN 730 and Core Network 740. Functions of S-GW 743 include, but are not limited to, packet routing, packet forwarding, transport level packet processing, event reporting to Policy and Charging Rules Function (PCRF) 750, and mobility anchoring for inter-network mobility. PCRF 750 uses information gathered from S-GW 743, as well as other sources, to make applicable policy and charging decisions related to data flows, network resources and other network administration functions. Packet Data Network Gateway (PDN-GW) 745 may provide user-to-services connectivity functionality including, but not limited to, network-wide mobility anchoring, bearer session anchoring and control, and IP address allocation for PS domain connections.

Home Subscriber Server (HSS) 763 is a database for user information; HSS 763 can store subscription data regarding Mobile Station 701 or User Equipment 702 for handling calls or data sessions. Networks may contain one HSS 763, or more if additional resources are required. Exemplary data stored by HSS 763 include, but is not limited to, user identification, numbering and addressing information, security information, or location information. HSS 763 may also provide call or session establishment procedures in both the PS and CS domains.

The VLR/MSC Server 760 can provide user location functionality. In an embodiment, when Mobile Station 701 enters a new network location, it begins a registration procedure. A MSC Server for that location transfers the location information to the VLR for the area. A VLR and MSC Server may be located in the same computing environment, as is shown by VLR/MSC Server 760, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 701 registration or procedures for handover of Mobile Station 701 to a different section of the Core Network 740. GMSC Server 761 may serve as a connection to alternate GMSC Servers for other mobile stations in larger networks.

Equipment Identity Register (EIR) 762 is a logical element which may store the International Mobile Equipment Identities (IMEI) for Mobile Station 701. In a typical embodiment, user equipment may be classified as either "white listed" or "black listed" depending on its status in the network. In one embodiment, if Mobile Station 701 is stolen and put to use by an unauthorized user, it may be registered as "black listed" in EIR 762, preventing its use on the network. Mobility Management Entity (MME) 764 is a control node which may track Mobile Station 701 or User Equipment 702 if the devices are idle. Additional functionality may include the ability of MME 764 to contact an idle Mobile Station 701 or User Equipment 702 if retransmission of a previous session is required.

Communication system 700 can be overlaid or operably coupled with system 600. In particular, system 700 can comprise a processing system including a processor that performs a method comprising providing communications services over a network to user communication devices using a carrier frequency band and to machine-to-machine (M2M) communication devices, the carrier frequency band having a guard band in a spectral region adjacent to the carrier frequency band; and monitoring a first communications traffic load in the carrier frequency band due to the user communication devices. The method can also comprise, responsive to the first communications traffic load being less than a first threshold, facilitating communications by the M2M communication devices using a first M2M frequency band narrower than the carrier frequency band and within the carrier frequency band. The method can also comprise, responsive to the first communications traffic load being not less than the first threshold and less than a second threshold, the first threshold being less than the second threshold, facilitating communications by the M2M communication devices using a second M2M frequency band narrower than the guard band and within the guard band. The method can also comprise, responsive to the first communications traffic load being not less than the second threshold, facilitating, by the processing system, communications by the M2M communication devices using a third M2M frequency band separate from the carrier frequency band and the guard band. The method can further comprise adjusting a spectral location of the communications by the M2M communication devices responsive to the first communications traffic load.

It is further noted that various terms used in the subject disclosure can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 8:
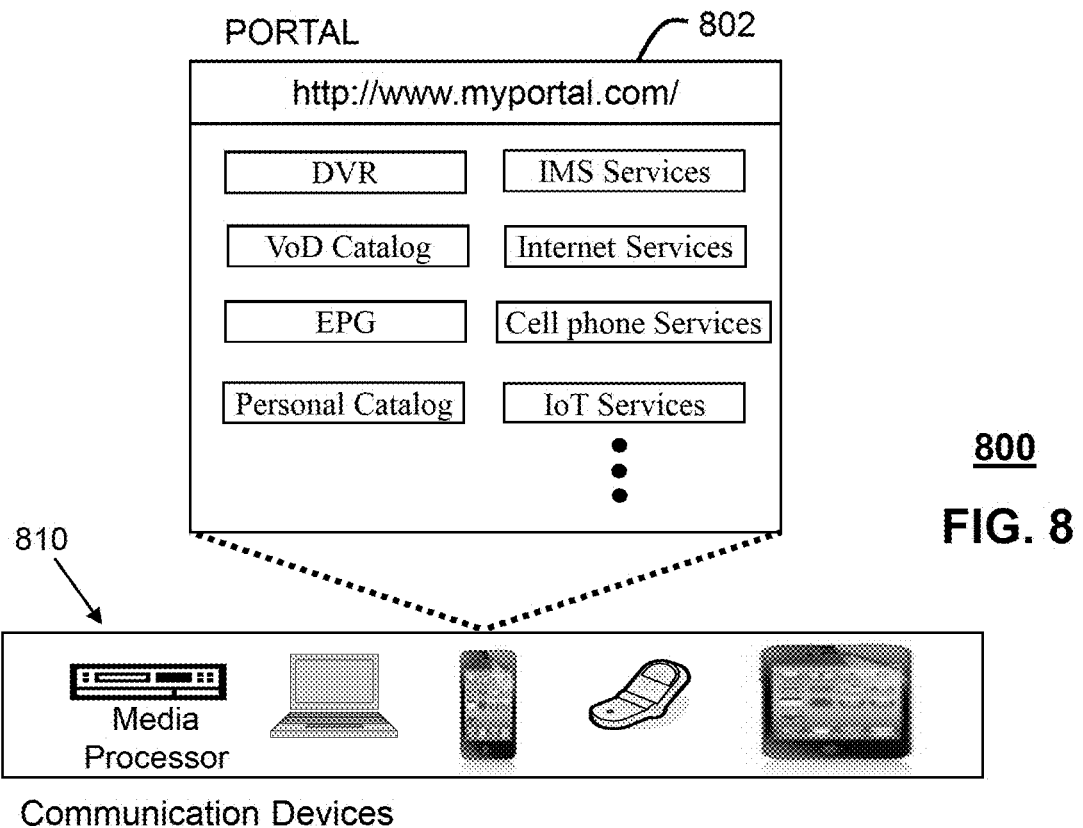
FIG. 8 depicts an illustrative embodiment of a web portal for interacting with the communication systems of FIGS. 6-7.

FIG. 8 depicts an illustrative embodiment of a web portal 802 of a communication system 800. Communication system 800 can be overlaid or operably coupled with the systems of FIGS. 6-7 as another representative embodiment of systems 600-700. The web portal 802 can be used for managing services of communication systems 600-700. A web page of the web portal 802 can be accessed by a Uniform Resource Locator (URL) with an Internet browser using an Internet-capable communication device such as those described in FIGS. 6-8. The web portal 802 can be configured, for example, to access a media processor and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor. The web portal 802 can also be used for provisioning various services on the communication devices 810, for example IMS services, Internet services, cellular phone services, IoT services, and so on.

In particular, web portal 802 can be used to access and/or configure IoT devices. In an embodiment, web portal 802 is used to perform inventory management of IoT devices.

The web portal 802 can further be utilized to manage and provision software applications and to adapt these applications as may be desired by subscribers and/or service providers of communication systems 600-700. For instance, users of the services provided by servers in systems 600-700 can log into their on-line accounts and provision those servers with information to enable communication with devices described in FIGS. 6-7, and so on. Service providers can log onto an administrator account to provision, monitor and/or maintain the systems 600-700 of FIGS. 6-7.

Figure 9:
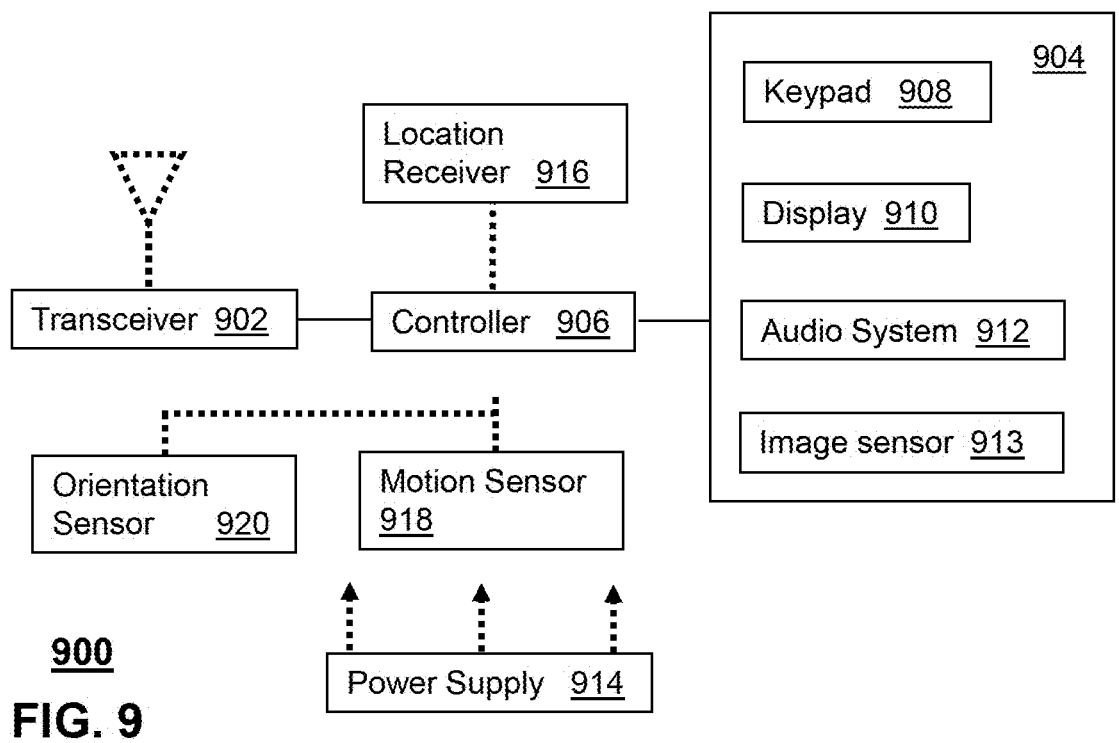
FIG. 9 depicts an illustrative embodiment of a communication device.

FIG. 9 depicts an illustrative embodiment of a communication device 900. Communication device 900 can serve in whole or in part as an illustrative embodiment of the devices depicted in FIGS. 6-8 and can be configured to perform portions of methods 300-500 of FIGS. 3-5.

Communication device 900 can comprise a wireline and/or wireless transceiver 902 (herein transceiver 902), a user interface (UI) 904, a power supply 914, a location receiver 916, a motion sensor 918, an orientation sensor 920, and a controller 906 for managing operations thereof. The transceiver 902 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 902 can also be adapted to support circuit-switched wireline access technologies (such as PSTN), packet-switched wireline access technologies (such as TCP/IP, VoIP, etc.), and combinations thereof.

The UI 904 can include a depressible or touch-sensitive keypad 908 with a navigation mechanism such as a roller ball, a joystick, a mouse, or a navigation disk for manipulating operations of the communication device 900. The keypad 908 can be an integral part of a housing assembly of the communication device 900 or an independent device operably coupled thereto by a tethered wireline interface (such as a USB cable) or a wireless interface supporting for example Bluetooth®. The keypad 908 can represent a numeric keypad commonly used by phones, and/or a QWERTY keypad with alphanumeric keys. The UI 904 can further include a display 910 such as monochrome or color LCD (Liquid Crystal Display), OLED (Organic Light Emitting Diode) or other suitable display technology for conveying images to an end user of the communication device 900. In an embodiment where the display 910 is touch-sensitive, a portion or all of the keypad 908 can be presented by way of the display 910 with navigation features.

The display 910 can use touch screen technology to also serve as a user interface for detecting user input. As a touch screen display, the communication device 900 can be adapted to present a user interface with graphical user interface (GUI) elements that can be selected by a user with a touch of a finger. The touch screen display 910 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 910 can be an integral part of the housing assembly of the communication device 900 or an independent device communicatively coupled thereto by a tethered wireline interface (such as a cable) or a wireless interface.

The UI 904 can also include an audio system 912 that utilizes audio technology for conveying low volume audio (such as audio heard in proximity of a human ear) and high volume audio (such as speakerphone for hands free operation). The audio system 912 can further include a microphone for receiving audible signals of an end user. The audio system 912 can also be used for voice recognition applications. The UI 904 can further include an image sensor 913 such as a charged coupled device (CCD) camera for capturing still or moving images.

The power supply 914 can utilize common power management technologies such as replaceable and rechargeable batteries, supply regulation technologies, and/or charging system technologies for supplying energy to the components of the communication device 900 to facilitate long-range or short-range portable applications. Alternatively, or in combination, the charging system can utilize external power sources such as DC power supplied over a physical interface such as a USB port or other suitable tethering technologies.

The location receiver 916 can utilize location technology such as a global positioning system (GPS) receiver capable of assisted GPS for identifying a location of the communication device 900 based on signals generated by a constellation of GPS satellites, which can be used for facilitating location services such as navigation. The motion sensor 918 can utilize motion sensing technology such as an accelerometer, a gyroscope, or other suitable motion sensing technology to detect motion of the communication device 900 in three-dimensional space. The orientation sensor 920 can utilize orientation sensing technology such as a magnetometer to detect the orientation of the communication device 900 (north, south, west, and east, as well as combined orientations in degrees, minutes, or other suitable orientation metrics).

The communication device 900 can use the transceiver 902 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 906 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 900.

Other components not shown in FIG. 9 can be used in one or more embodiments of the subject disclosure. For instance, the communication device 900 can include a reset button (not shown). The reset button can be used to reset the controller 906 of the communication device 900. In yet another embodiment, the communication device 900 can also include a factory default setting button positioned, for example, below a small hole in a housing assembly of the communication device 900 to force the communication device 900 to re-establish factory settings. In this embodiment, a user can use a protruding object such as a pen or paper clip tip to reach into the hole and depress the default setting button. The communication device 900 can also include a slot for adding or removing an identity module such as a Subscriber Identity Module (SIM) card. SIM cards can be used for identifying subscriber services, executing programs, storing subscriber data, and so forth.

The communication device 900 as described herein can operate with more or less of the circuit components shown in FIG. 9. These variant embodiments can be used in one or more embodiments of the subject disclosure.

The communication device 900 can be adapted to perform the functions of devices of FIGS. 6 and/or 7, as well as the IMS CDs 801-802 and PSTN CDs 803-505 of FIG. 8. It will be appreciated that the communication device 900 can also represent other devices that can operate in communication systems 600-800 of FIGS. 6-8.

Upon reviewing the aforementioned embodiments, it would be evident to an artisan with ordinary skill in the art that said embodiments can be modified, reduced, or enhanced without departing from the scope of the claims described below. For example, NB-IoT carriers can be dynamically switched from in-band to guard-band, or instead be deployed as standalone carriers, according to an order of preference different from that shown above (for example, move from one LTE carrier to another LTE carrier before deploying to the guard band of either carrier). Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 10:
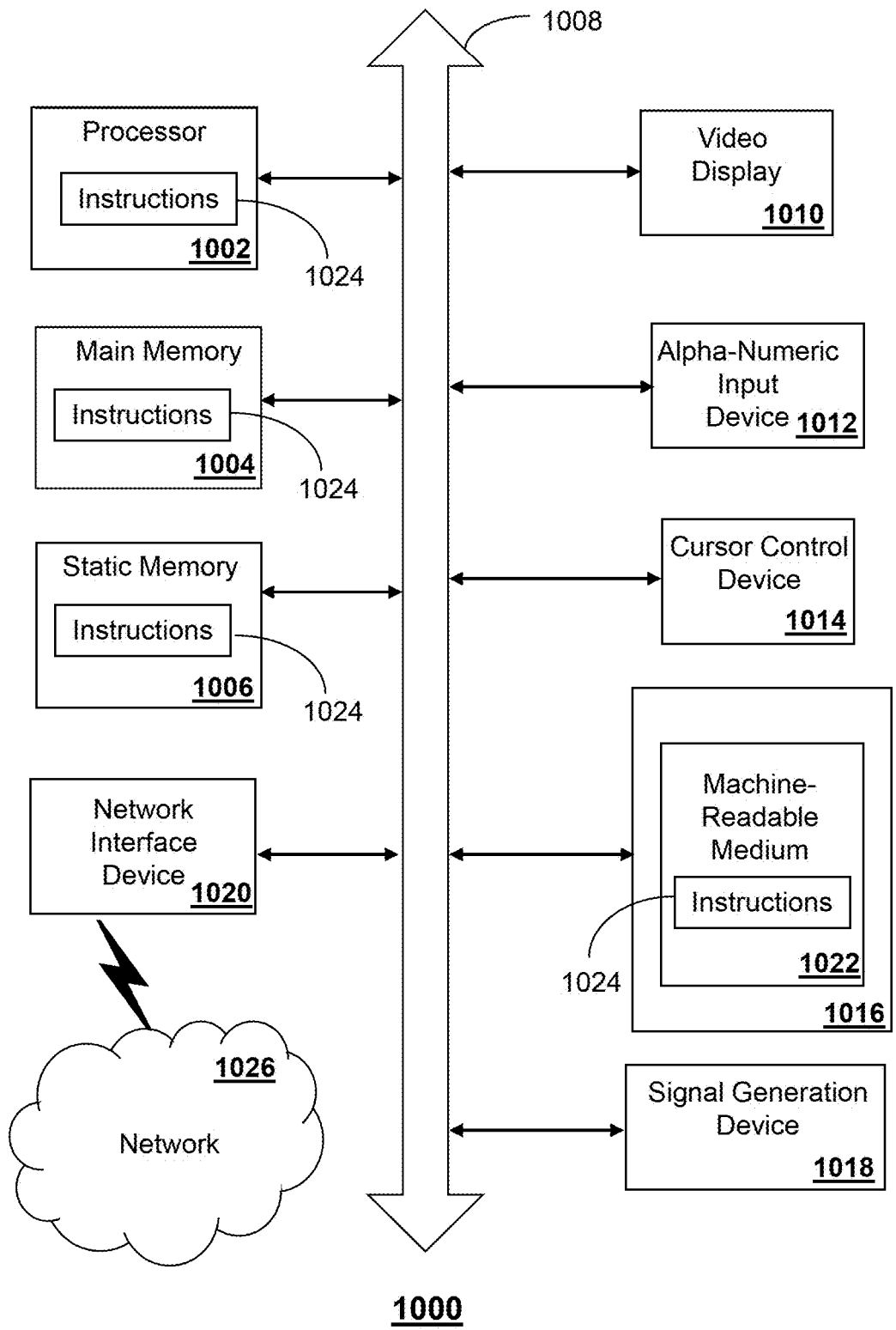
FIG. 10 is a diagrammatic representation of a machine in the form of a computer system within which a set of instructions, when executed, may cause the machine to perform any one or more of the methods described herein.

FIG. 10 depicts an exemplary diagrammatic representation of a machine in the form of a computer system 1000 within which a set of instructions, when executed, may cause the machine to perform any one or more of the methods described above. One or more instances of the machine can operate, for example, as decision engine 201, MMEs 520 devices 615-616, MS 701, UE 702, server 890, and other devices of FIGS. 2 and 6-8. In some embodiments, the machine may be connected (e.g., using a network 1026) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1000 may include a processor (or controller) 1002 (e.g., a central processing unit (CPU)), a graphics processing unit (GPU, or both), a main memory 1004 and a static memory 1006, which communicate with each other via a bus 1008. The computer system 1000 may further include a display unit 1010 (e.g., a liquid crystal display (LCD), a flat panel, or a solid state display). The computer system 1000 may include an input device 1012 (e.g., a keyboard), a cursor control device 1014 (e.g., a mouse), a disk drive unit 1016, a signal generation device 1018 (e.g., a speaker or remote control) and a network interface device 1020. In distributed environments, the embodiments described in the subject disclosure can be adapted to utilize multiple display units 1010 controlled by two or more computer systems 1000. In this configuration, presentations described by the subject disclosure may in part be shown in a first of the display units 1010, while the remaining portion is presented in a second of the display units 1010.

The disk drive unit 1016 may include a tangible computer-readable storage medium 1022 on which is stored one or more sets of instructions (e.g., software 1024) embodying any one or more of the methods or functions described herein, including those methods illustrated above. The instructions 1024 may also reside, completely or at least partially, within the main memory 1004, the static memory 1006, and/or within the processor 1002 during execution thereof by the computer system 1000. The main memory 1004 and the processor 1002 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1022 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1000. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   providing, by a processing system including a processor, communications services over a network to user communication devices and to machine-to-machine (M2M) communication devices, wherein the communications services are provided using a carrier frequency band and at least a portion of the M2M communication devices use a first M2M frequency band within the carrier frequency band, wherein a guard band in a spectral region adjacent to the carrier frequency band comprises a first portion having frequencies lower than the carrier frequency band and a second portion having frequencies higher than the carrier frequency band, wherein a portion of the M2M communication devices use a second M2M frequency band within the guard band, and wherein the user communication devices and the M2M communication devices are coupled to processors of a plurality of mobile management entities (MMEs) for controlling access to the network;
   monitoring, by the processing system, loading of the processors of the plurality of MMEs by the M2M communication devices;
   distributing, by the processing system, the loading of the processors of the plurality of MMEs by the M2M communication devices, wherein the distributing comprises transmitting signals to the plurality of MMEs and receiving feedback from the plurality of MMEs regarding loading by the M2M communication devices of each of the processors of the plurality of MMEs, thereby facilitating balancing of the loading by the M2M communication devices with respect to the processors of the plurality of MMEs; and
   responsive to the loading of the processors of the plurality of MMEs exceeding a MME loading threshold, discontinuing further facilitating of communications by the M2M communication devices.

2. The method of claim 1, further comprising monitoring, by the processing system, communications traffic on the first M2M frequency band.

3. The method of claim 1, wherein the plurality of MMEs are coupled to the user communication devices and the M2M communication devices in a pooled configuration.

4. The method of claim 1, wherein the first M2M frequency band and the second M2M frequency band each have a bandwidth of approximately 200 kHz.

5. The method of claim 1, wherein the distributing comprises facilitating communications, using the second M2M frequency band, between at least one of the communication devices and at least one of the plurality of MMEs.

6. The method of claim 2, wherein the communications using the second M2M frequency band are facilitated responsive to the communicationstraffic on the first M2M frequency band exceeding a communications traffic threshold.

7. The method of claim 3, wherein the distributing further comprises loading of the processors of the plurality of MMEs in the pooled configuration by the M2M communication devices.

8. The method of claim 1, further comprising facilitating, by the processing system subsequent to the discontinuing, the communications by the M2M communication devices responsive to the loading of the processors of the plurality of MMEs not exceeding the MME loading threshold.

9. A device comprising:
a processing system including a processor; and
a memory that stores executable instructions that, when executed by the processing system, facilitate performance of operations comprising:
providing communications services over a network to user communication devices and to machine-to-machine (M2M) communication devices, wherein the communications services are provided using a carrier frequency band, wherein at least a portion of the M2M communication devices use a first M2M frequency band within the carrier frequency band, wherein a guard band in a spectral region adjacent to the carrier frequency band comprises a first portion having frequencies lower than the carrier frequency band and a second portion having frequencies higher than the carrier frequency band, wherein a portion of the M2M communication devices use a second M2M frequency band within the guard band, and wherein the user communication devices and the M2M communication devices are coupled to processors of a plurality of mobile management entities (MMEs) for controlling access to the network;
monitoring loading of the processors of the plurality of MMEs by the M2M communication devices; and
distributing the loading of the processors of the plurality of MMEs by the M2M communication devices, wherein the distributing comprises transmitting signals to the plurality of MMEs and receiving feedback from the plurality of MMEs regarding loading by the M2M communication devices of each of the processors of the plurality of MMEs, thereby facilitating balancing of the loading by the M2M communication devices with respect to the processors of the plurality of MMEs.

10. The device of claim 9, wherein the operations further comprise monitoring communications traffic on the first M2M frequency band.

11. The device of claim 9, wherein the plurality of MMEs are coupled to the user communication devices and the M2M communication devices in a pooled configuration.

12. The device of claim 9, wherein the plurality of MMEs are coupled to the user communication devices and the M2M communication devices in a pooled configuration, and wherein the distributing further comprises loading of the processors of the plurality of MMEs in the pooled configuration by the M2M communication devices.

13. The device of claim 9, wherein the operations further comprise:
responsive to the loading of the processors of the plurality of MMEs exceeding a MME loading threshold, discontinuing further facilitating of communications by the M2M communication devices.

14. The device of claim 13, wherein the operations further comprise facilitating, subsequent to the discontinuing, the communications by the M2M communication devices responsive to the loading of the processors of the plurality of MMEs not exceeding the MME loading threshold.

15. A machine-readable storage medium comprising executable instructions that, when executed by a processing system including a processor, facilitate performance of operations comprising:
providing communications services over a network to user communication devices and to machine-to-machine (M2M) communication devices, wherein the communications services are provided using a carrier frequency band and at least a portion of the M2M communication devices use a first M2M frequency band within the carrier frequency band, wherein a guard band in a spectral region adjacent to the carrier frequency band comprises a first portion having frequencies lower than the carrier frequency band and a second portion having frequencies higher than the carrier frequency band, wherein a portion of the M2M communication devices use a second M2M frequency band within the guard band, and wherein the user communication devices and the M2M communication devices are coupled to processors of a plurality of mobile management entities (MMEs) for controlling access to the network;
monitoring loading of the processors of the plurality of MMEs by the M2M communication devices; and
distributing the loading of the processors of the plurality of MMEs by the M2M communication devices, wherein the distributing comprises transmitting signals to the plurality of MMEs and receiving feedback from the plurality of MMEs regarding loading by the M2M communication devices of each of the processors of the plurality of MMEs, thereby facilitating balancing of the loading by the M2M communication devices with respect to the processors of the plurality of MMEs.

16. The machine-readable storage medium of claim 15, wherein the operations further comprise monitoring communications traffic on the first M2M frequency band.

17. The machine-readable storage medium of claim 15, wherein the plurality of MMEs are coupled to the user communication devices and the M2M communication devices in a pooled configuration.

18. The machine-readable storage medium of claim 17, wherein the distributing further comprises loading of the processors of the plurality of MMEs in the pooled configuration by the M2M communication devices.

19. The machine-readable storage medium of claim 15, wherein the operations further comprise:
responsive to the loading of the processors of the plurality of MMEs exceeding a MME loading threshold, discontinuing further facilitating of communications by the M2M communication devices.

20. The machine-readable storage medium of claim 19, wherein the operations further comprise facilitating, subsequent to the discontinuing, the communications by the M2M communication devices responsive to the loading of the processors of the plurality of MMEs not exceeding the MME loading threshold.

* * * * *